(12) United States Patent
Edwards et al.

(10) Patent No.: US 10,360,534 B2
(45) Date of Patent: Jul. 23, 2019

(54) SYSTEMS AND METHODS FOR AUTOMATING MONITORING OF THE CONTENTS OF A CONTAINER

(71) Applicant: WeighUp LLC, Memphis, TN (US)

(72) Inventors: Brian Edwards, Cordova, TN (US); James Kegel, Memphis, TN (US); Phillip Geller, Memphis, TN (US)

(73) Assignee: WeighUp LLC, Memphis, TN (US)

( * ) Notice: Subject to any disclaimer, the term of this patent is extended or adjusted under 35 U.S.C. 154(b) by 0 days.

(21) Appl. No.: 16/058,142

(22) Filed: Aug. 8, 2018

(65) Prior Publication Data

US 2018/0349848 A1 Dec. 6, 2018

Related U.S. Application Data

(63) Continuation-in-part of application No. 15/685,989, filed on Aug. 24, 2017, now Pat. No. 10,074,074.

(60) Provisional application No. 62/379,170, filed on Aug. 24, 2016.

(51) Int. Cl.

| G06Q 30/00 | (2012.01) |
| G01G 17/04 | (2006.01) |
| G01G 19/42 | (2006.01) |
| G06Q 10/08 | (2012.01) |
| G06Q 20/20 | (2012.01) |
| G06Q 50/12 | (2012.01) |
| G01G 19/414 | (2006.01) |

(52) U.S. Cl.
CPC ......... *G06Q 10/0875* (2013.01); *G01G 17/04* (2013.01); *G01G 19/4144* (2013.01); *G01G 19/4148* (2013.01); *G01G 19/42* (2013.01); *G06Q 20/203* (2013.01); *G06Q 50/12* (2013.01); *G06Q 30/0185* (2013.01)

(58) Field of Classification Search
None
See application file for complete search history.

(56) References Cited

U.S. PATENT DOCUMENTS

| 7,750,817 | B2 | 7/2010 | Teller | |
| 8,954,347 | B1* | 2/2015 | Einfalt | G06Q 10/087 340/613 |
| 2006/0131404 | A1 | 6/2006 | Dervishian | |
| 2006/0238346 | A1 | 10/2006 | Teller | |
| 2007/0005493 | A1* | 1/2007 | Kandravy | G06Q 20/10 705/39 |
| 2009/0261974 | A1 | 10/2009 | Bailey et al. | |
| 2011/0050431 | A1 | 3/2011 | Hood et al. | |

(Continued)

*Primary Examiner* — Allen C Chein (74) *Attorney, Agent, or Firm* — The Noblitt Group, PLLC (57) ABSTRACT

The present technology relates to a container monitoring system for monitoring the content of containers, such as beverage bottles. The monitoring system is automated to record the content of the containers according to a metric such, as the container's weight and capture variances in the container's content for reconciliation with data such as sales data to expose irregularities in the consumption of the container's contents to provide inferences as to the cause of those irregularities. Various embodiments of the monitoring system may comprise a scale assembly for producing scale data, a processor module communicatively linked to the scale assembly, and a front end server application for processing and comparing the scale data to point of sale data and pushing notifications, reports, and other data to a user.

12 Claims, 6 Drawing Sheets

(56) References Cited

U.S. PATENT DOCUMENTS

| | | | |
|---|---|---|---|
| 2012/0158529 A1* | 6/2012 | Edwards | G06Q 20/20 |
| | | | 705/23 |
| 2013/0253965 A1* | 9/2013 | Joseph | G06Q 20/4016 |
| | | | 705/5 |
| 2014/0242558 A1 | 8/2014 | Daragjati | |
| 2014/0273930 A1* | 9/2014 | Rossi | H04M 15/43 |
| | | | 455/406 |
| 2018/0328777 A1* | 11/2018 | Gurumohan | G01F 23/2962 |

* cited by examiner

SYSTEMS AND METHODS FOR AUTOMATING MONITORING OF THE CONTENTS OF A CONTAINER

CROSS-REFERENCES TO RELATED APPLICATIONS

This application is a continuation-in-part of U.S. patent application Ser. No. 15/685,989 filed on Aug. 24, 2017, which claims the benefit of U.S. Provisional Application Ser. No. 62/379,170, filed Aug. 24, 2016, and incorporates the disclosure that application by reference. To the extent that the present disclosure conflicts with the referenced application, however, the present disclosure is to be given priority.

BACKGROUND

Operating commercial bars and restaurants generally necessitates monitoring and control over the dispensation of beverages. Liquor beverages are particularly susceptible to various irregularities that are associated with decreasing the profitability of the sale of such beverages. Liquor sales may be affected by various dispensation factors including substitute pours, pour accuracy, backpours, spillage, theft, and a variety of other irregularities that may be intentional or inadvertent by bartenders and/or other restaurant staff.

Reducing revenue losses from liquor dispensation irregularities depends on the often tedious process of regularly measuring the amount of liquor in stock and aligning the amounts with sales information to expose those irregularities. Identifying problematic bartenders and/or other bar or restaurant staff may be time consuming, inaccurate, and too infrequent to effectively prevent lost revenue.

Existing attempts to monitor dispensation of beverages has included systems that monitor dispensing activities through the use of bar codes, scales, and tracking applications that monitor usage activities associated with individual beverages and bottles in a bar. A drawback of these systems is that they are unable to provide real-time reporting and instead rely on auditing functions associated with requiring a user to monitor the system from a computer or like terminal center where the user must monitor individual line items as they occur or run reports to obtain desired detailed information on irregularities after they have occurred. These systems are also unable to push notifications to specified users regarding identified irregularities that can be addressed in real-time during a shift so that potential problems can be addressed immediately.

SUMMARY

The present technology relates to a container monitoring system for monitoring the content of containers, such as beverage bottles. The monitoring system is automated to record the content of the containers according to a metric such, as the container's weight and capture variances in the container's content for reconciliation with data such as sales data to expose irregularities in the consumption of the container's contents to provide inferences as to the cause of those irregularities. Various embodiments of the monitoring system may comprise a scale assembly for producing scale data, a processor module communicatively linked to the scale assembly, and a front end server application for processing and comparing the scale data to point of sale data and pushing notifications, reports, and other data to a user.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps throughout the figures.

Elements and steps in the figures are illustrated for simplicity and clarity and have not necessarily been rendered according to any particular sequence or scale. For example, steps that may be performed concurrently or in different order are illustrated in the figures help to improve understanding of embodiments of the present invention.

The figures described are for illustration purposes only and are not intended to limit the scope of the present disclosure in any way. Various aspects of the present invention may be more fully understood from the detailed description and the accompanying drawing figures, wherein.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, methods and systems according to various aspects of the present technology may employ various process steps, apparatus, systems, methods, materials, etc. In addition, the present invention may be practiced in conjunction with any number of methods, data sources, databases, metrics, networks, algorithms, graphical interfaces, data viewing tools, and devices used to analyze, model, and report various aspects of beverage monitoring processes, and the system described is merely one exemplary application for the technology.

Various aspects of the technology provide methods, apparatus, and systems for substantially real-time monitoring of any container for variances in the container's weight, volume, or other preselected metric. In some embodiments, the container may be a beverage bottle that may be monitored in a bar, lounge, and/or restaurant. For example, the beverage bottles being monitored may comprise a variety of liquors and/or wine that may be open and in use for dispensation. Monitoring the beverage bottles, or other containers, may comprise capturing the weight or volume change of the individual beverage bottles on a predetermined frequency to record changes in weight and reconciling the changes in weight of individual beverage bottles with sales data to identify irregularities.

While the exemplary embodiments described herein relate to beverage monitoring, the present systems and methods may be applied to any suitable business and/or other service that has dispensation or output activity that may be accounted for through the weight of the item being reduced as the item is dispensed or otherwise used. For example, various aspects of the present systems and methods may be implemented in a pharmacy, a chemical laboratory, and/or a doctor's office.

Figure 1:
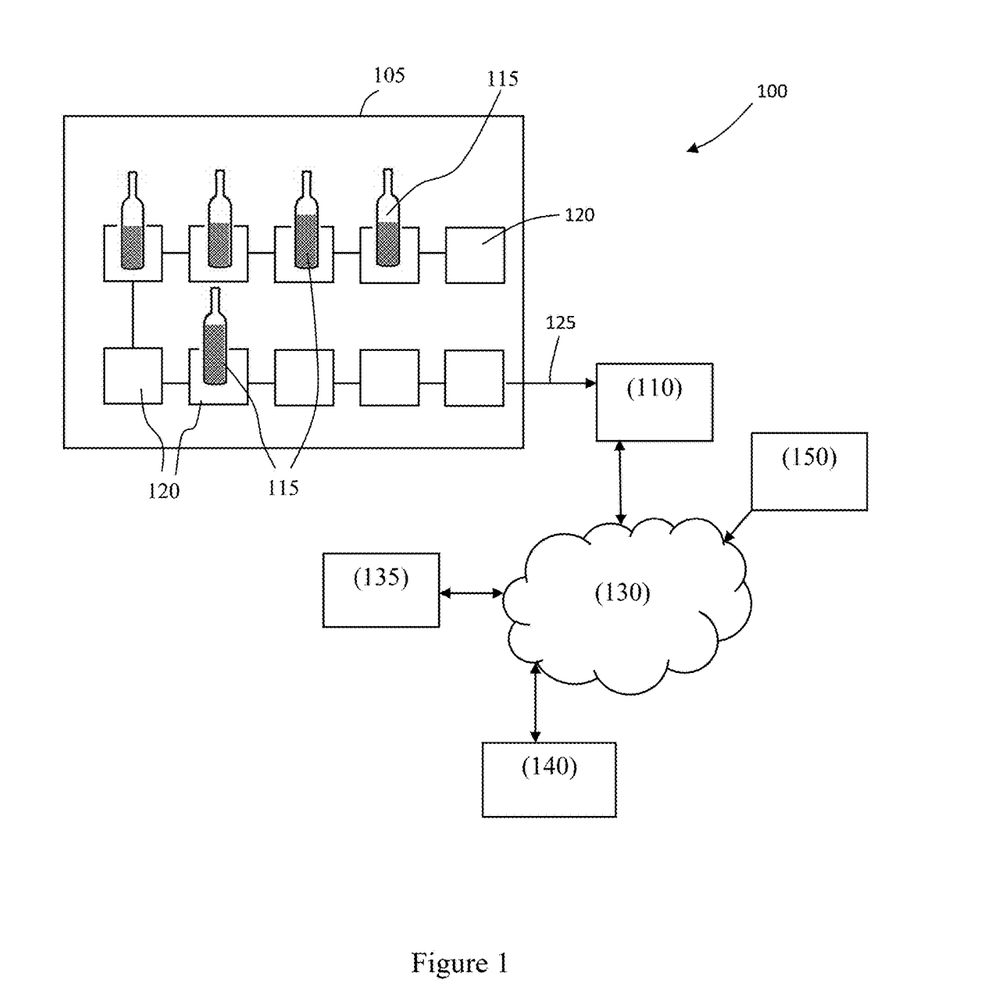
FIG. 1 is a block diagram of an exemplary embodiment of the beverage monitoring system.

Referring to FIG. 1, various embodiments of the beverage monitoring system 100 may comprise a scale assembly 105, a processor module 110, a cloud based application server 135, and a front-end application 140 (also referred to as a "dashboard"). The beverage monitoring system 100 is configured to monitor changes in the weights of a plurality of beverages bottles 115 generally resulting from usage such as liquor pours from a bar in a lounge and/or restaurant. The changes in weights may then be compared against que data from a point-of-sale (POS) system 150 to monitor usage of the beverages bottles 115.

The POS system 150 may comprise any system for collecting POS data for an establishment. For example, in one embodiment, the POS system 150 may comprise an ordering system used by service staff to take order from customers. POS data may comprise order information relating to ordered food and beverage items. The POS system 150 may comprise an existing system used by the establishment to send orders to a kitchen, bar, or other locations within the establishment. Alternatively, the POS system 150 may comprise a system integrated with the beverage monitoring system 100 as a single solution.

The scale assembly 105 is configured to support the beverage bottles 115 and measure the weight of each beverage bottle 115 on a continuous, semi-continuous, or pre-determined time interval. The scale assembly 105 may be implemented in any location where bartenders and other bar and restaurant staff may retrieve and promptly replace the beverage bottles 115 to the scale assembly 105.

The scale assembly 105 may comprise any suitable device capable of measuring the volume and/or weight of a container. For example, the scale assembly may comprise a weighing sensor, an optical sensor, or any other device capable of recording, capturing, identifying, or otherwise sensing changes in the weight and volume of each beverage bottle 115 connected to the beverage monitoring system 100. For example, with continued reference to FIG. 1, the scale assembly 105 may comprise a plurality of individually addressable scale coasters 120 having a platform for receiving an individual beverage bottle 115 and supporting its weight. The scale assembly 105 may be configured to sense, measure, and/or record the weight of each beverage bottle 115 (or other container) when placed on each scale coaster 120. If a given beverage bottle 115 is removed from the scale assembly 105, the scale assembly 105 may record any sensed change in weight of the beverage bottle 115 when the bottle is replaced on the scale assembly 105.

Each beverage bottle 115 may be identified by an addressed scale coaster 120 within the plurality of scale coasters 120 and matched to its weight data. In another embodiment, the scale assembly 105 may comprise one scale that is configured to identify and measure the weight of beverage bottles 115 that are placed anywhere on the scale (not shown).

The scale assembly 105 may comprise an identification system for identifying the beverage bottles 115 placed on the scale coasters 120. The identification system may be equipped with any suitable identification hardware such as a near-field communication (NFC) reader or radio frequency identification (RFID) reader that reads the corresponding labels placed on each beverage bottle 115. The scale assembly 105 may transmit a product ID for each beverage bottle 115 to the processor module 110. The identification system may be located in close proximity to the scale coasters 120. For example, an RFID reader may be attached to each scale coaster 120. Such an arrangement may allow for the substantially simultaneous identification and weight measurement of the beverage bottle 115 which may be beneficial in a fast-pace bar environment. This may also allow for individual beverage bottles 115 to be taken from one scale coaster 120 and replaced on a different scale coaster 120 without disrupting operation of the system. In some embodiments, a user such as a bartender and/or other restaurant staff may manually input the name and type of beverage bottle 115 placed on a particular scale coaster 120 creating a one-to-one relationship between beverage bottle 115 and scale coaster 120.

The processor module 110 is communicatively linked to the scale assembly 105 to receive scale data. The processor module 110 may be located proximate to the scale assembly 105 or located remotely. Scale data may comprise any suitable information such as: sensed changes in weight of individual beverage bottles 115; changes in volume of individual beverage bottles 115; the amount of time one or more beverage bottles 115 were removed from the scale assembly before being replaced; the contents of each beverage bottle 115; and location of each beverage bottle 115 on the scale assembly 105.

Various embodiments of the processor module 110 may be communicatively linked to the scale assembly 105 through a data line 125 or via wireless communication network. The processor module 110 may also be communicatively linked to the front-end application 140 and a cloud based application server 135 through a network 130. The application server 135 may comprise any suitable system for processing scale data and POS data to draw inferences for the end user. For example, the application server 135 may comprise a database storing information such as, but not limited to, drink recipes, employee information, inference tables, allowance tables, alert notifications, and the like.

The processor module 110 may receive the scale data from the scale assembly 105 as the scale data is generated, at regular intervals, and/or when a user queries the processor module 110 through the front-end application 140. Scale data produced in real-time may include scale data obtained at the actual time the beverage bottle 115 is replaced on the scale coaster 120. Scale data produced in substantially real-time may include scale data obtained near the actual time the beverage bottle 115 is replaced on the scale coaster 120, such as within a few seconds. The weights of the beverage bottles 115 may be provided to the processor module 110 at any desired intervals, such as once per second. For example, the processor module 110 may be configured to establish the physical location of every scale coaster 120 based on the individual address of the scale coaster 120 such that the individual address of each scale coaster 120 corresponds to a map of the scale assembly 105. The processor module 110 may be configured to run a diagnostic check of each scale coaster 120 and identify the individual address of any defective scale coaster 120.

In some embodiments, the processor module 110 may also comprise an identification system for identifying the beverage bottles 115, much like the identification system that may be part of the scale assembly 105. For example, the identification system may comprise a handheld RFID reader communicatively linked to the processor module 110 for reading an RFID tag on the beverage bottles 115 before they are placed on the scale coasters 120.

In various embodiments, the processor module 110 may be accessed by the end user to configure the scale assembly 105, communicatively link the processor module 110 to a new scale assembly 105, calibrate a scale coaster 120 in the scale assembly 105, enter bottle identification information (eg., the brand and type of liquor such as Patrón® tequila), the time that each bottle weight was measured, location of the scale assembly 105 in the restaurant (eg., east bar or west bar within the same restaurant), and/or the names of bartending staff working during the times bottle weights were measured.

The processor module 110 may transmit the scale data to the application server 135 over the network 130 at preselected regular intervals and/or upon query from an end user. In some embodiments, the processor module 110 may compile an array of weights and times from all the scale coasters 120 into a file for export to the application server 135. Such compiled reporting may be produced on demand by the end user and/or generated by the processor module 110 at regular intervals.

Figure 2:
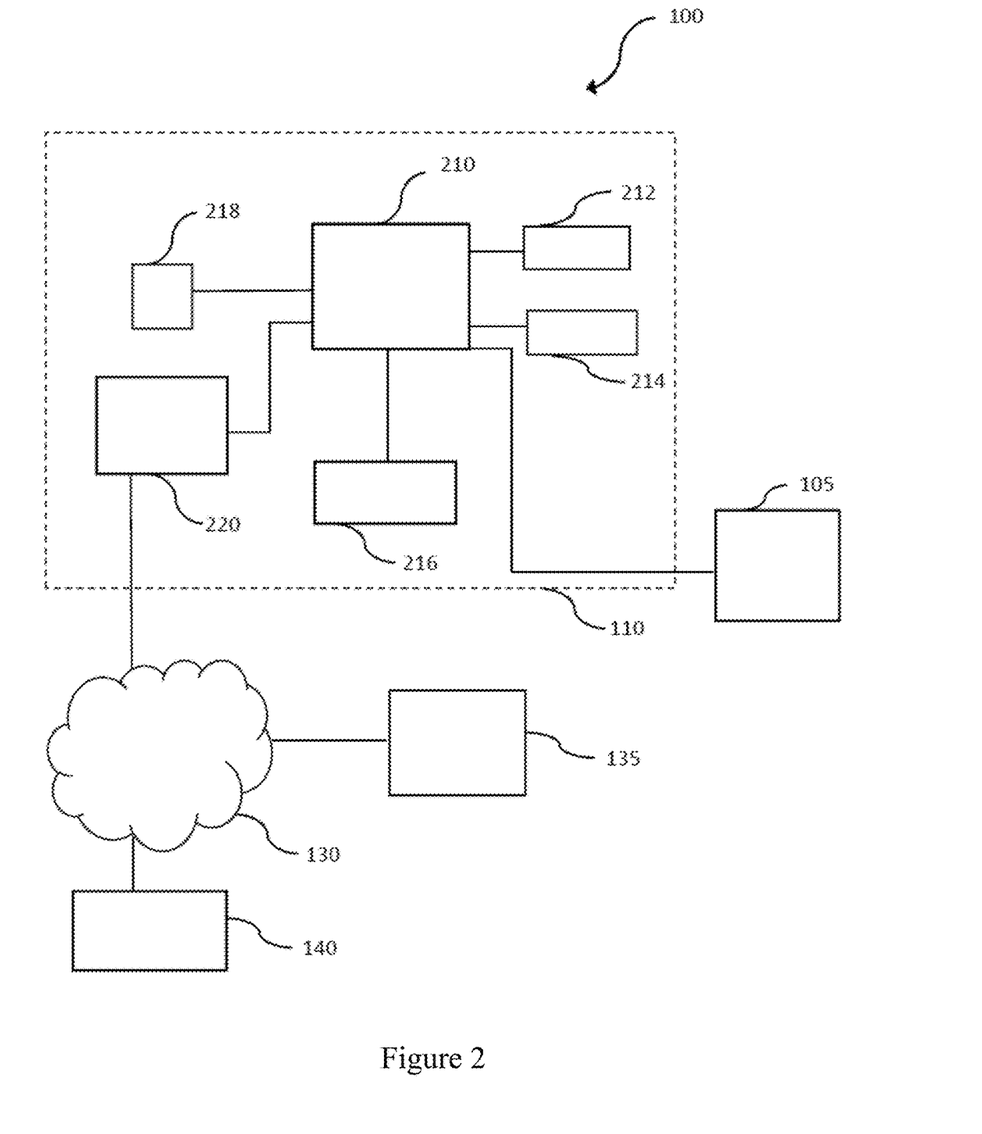
FIG. 2 is a block diagram of an exemplary embodiment of the beverage monitoring system.

Referring to FIG. 2, the processor module 110 may comprise a typical general-purpose computer system suitable for implementing one or more of the present embodiments, including a processor 210 in communication with memory devices, such as read only memory (ROM) 212, random access memory (RAM) 214, and secondary storage 216. The processor 210 may also connect to one or more input/output (I/O) devices 218 and/or network connectivity devices 220.

The processor 210 may comprise logic circuitry to perform various functions in response to inputs. The processor 210 may execute instructions, codes, computer programs, scripts, and/or the like, which may be received or accessed from any suitable source. For example, the processor 210 may comprise a conventional digital processor that responds to and processes the basic instructions provided via a set of inputs, for example to drive a computer. The processor 210 may comprise a conventional central processing unit (CPU), such as a conventional microprocessor. The processor 210 may be implemented as one or more CPU chips. In one embodiment, the processor 210 retrieves instructions from secondary storage 216, stores them in RAM 214 for fast access, and executes the instructions for various tasks, such as retrieving and processing data from various sources.

In one embodiment, the processor 210 may be configured to process scale data and POS data. For example, in one embodiment, the scale assembly 105 may first send the scale information over the network 130 to the application server 135. The application server 135 may then transmit the scale data and POS data back to the to the processor module 110 for processing.

The ROM 212 may store instructions and data for operating the computer system 200. The ROM 212 may be a nonvolatile memory device. After data has been stored in the ROM 212, the data can only be removed or modified slowly, with difficulty, or not at all. The ROM 212 may include instructions and data for basic operation of the processor module 110, such as the initial boot program that runs when the processor module 110 is activated.

The RAM 214 may also store instructions and/or data for operating the processor module 110, and may comprise relatively fast volatile memory such that stored information is lost when deactivated. A volatile RAM 214 may be used by the processor 210 to store information that needs to be used very quickly, but may not store information permanently.

The secondary storage 216 may comprise a relatively large information storage medium and/or system, such as one or more disk drives or tape drives. The secondary storage 216 may be used, for example, for nonvolatile information storage and for overflow data storage device if the capacity of RAM 214 is exceeded, for example to store data retrieved from other sources and relatively static data, such as historic data or constants used in calculating KPI scores. In various embodiments, the secondary storage 216 may include one or more databases, such as for storing and organizing data. The secondary storage 216 may also be used to store programs that may be loaded into RAM 214 when such programs are selected for execution. Access to both ROM 212 and RAM 214 is typically faster than to secondary storage 216.

The I/O devices 218 may transfer information between the processor module 110 and peripheral devices. For example, the I/O devices may include printers, video monitors such as liquid crystal displays (LCDs) and touch screen displays, keyboards, keypads, switches, dials, mice, track balls, voice recognizers, card readers, and the like. The processor module 110 may include interface systems to facilitate communications with the I/O devices, such as networking cards, graphics cards, USB ports, and the like.

The network connectivity devices 220 facilitate communications between the processor module 110 and one or more networks. The network connectivity devices may comprise any suitable network connectivity devices, such as network interface cards, hubs, switches, bridges, routers, gateways, repeaters, modems, modem banks, ethernet cards, universal serial bus (USB) interface cards, serial interfaces, token ring cards, fiber distributed data interface (FDDI) cards, wireless local area network (WLAN) cards, and radio transceiver cards such as code division multiple access (CDMA) and/or global system for mobile communications (GSM) radio transceiver cards. The network connectivity devices 220 may also include one or more transmitters and receivers for wirelessly or otherwise transmitting and receiving signals.

The network connectivity devices 220 may enable the processor 210 to communicate over networks such as the Internet or one or more intranets. By operating in conjunction with a network, the processor module 110 may receive information from the network and/or output information to the network in the course of performing the beverage monitoring processes and functions.

Such information, which may include a sequence of instructions to be executed using the processor 210, may be received from and outputted to the network via a transmission medium. The transmission medium may comprise any appropriate medium for communicating information, such as electrical signals, optical signals, wireless connection, and/or RF communications. In one embodiment, information is communicated in the form of a computer data baseband signal or signal embodied in a carrier wave.

The front-end application 140 allows a user to interface with the application server 135 to monitor the scale assembly 105. The front-end application 140 may comprise any suitable system or device for allowing a user to access processed scale and POS data, receive and respond to notifications from the application server 135 relating to identified inferences and/or alerts, track employee performance, or any other suitable action. The front-end application 140 may also be configured to receive and transmit information and/or data to and from the processor module 110. For example, the front-end application 140 may be configured to display scale data generated by the scale assembly 105 on a real-time or substantially real-time basis. In another example, the front-end application 140 may be configured to receive information and/or processed data from the application server 135.

The front-end application 140 may transmit and/or receive information wirelessly (WIFI, Bluetooth™), via a hard-wire connection, or over a mobile/cellular communications network. For example, and referring now to FIG. 3, the front-end application 140 may be installed locally as an application on a mobile computing device 302 such as a mobile phone, tablet computer, or the like and presented to the user in the form of a dashboard 304. Processed scale data and POS data may be presented in viewable form by the dashboard 304 for use and review by one or more users, such as a manager, owner, or other employee.

Figure 3:
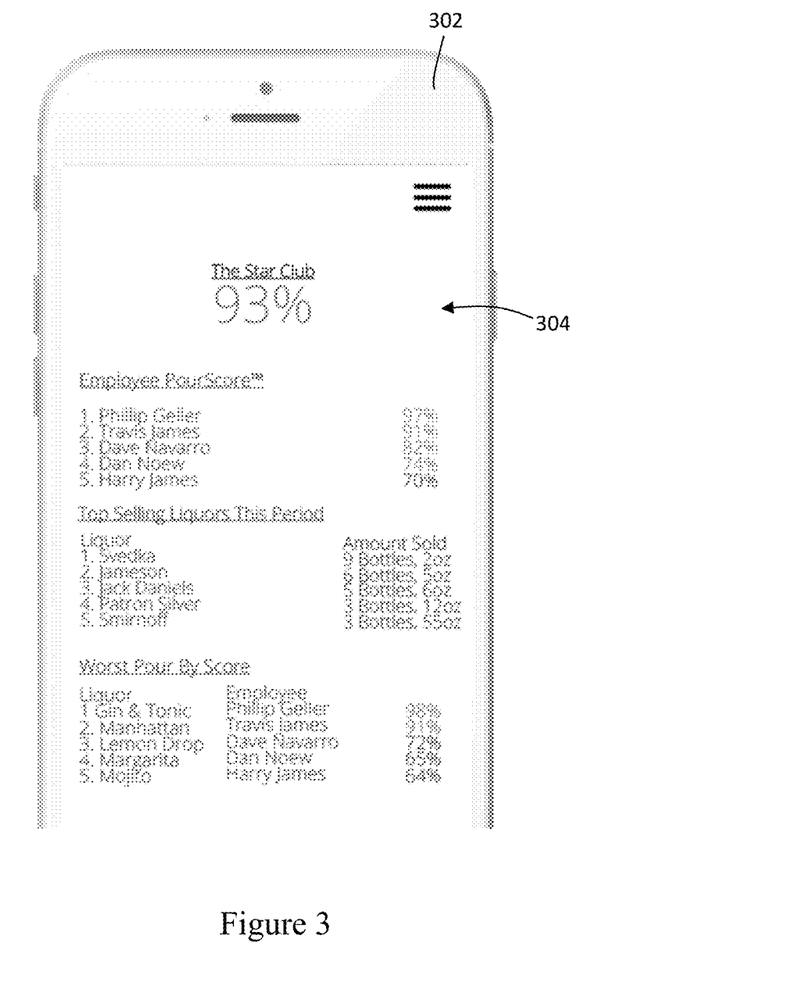
FIG. 3 is an illustration of a user interface for the beverage monitoring system in accordance with an exemplary embodiment of the present technology.

The dashboard 304 may comprise a plurality of data fields that may be used to query the application server 135 and/or the processor module 110 for the appropriate data for population into each data field. For example, the dashboard 304 may have data fields for the beverage bottle 115 identification information, position of the beverage bottle 115 on the scale assembly 105, bartending staff names and schedules, POS system 150 information, beverage bottle 115 weight measurements, and/or notification queues for alerting the end user to irregularities. In some embodiments, the dashboard 304 may be configured to display various reports. The reports may comprise processed data such as the usage of particular liquors over time, ordering processes, liquor usage trends, and/or fluctuations in liquor cost.

Figure 4:
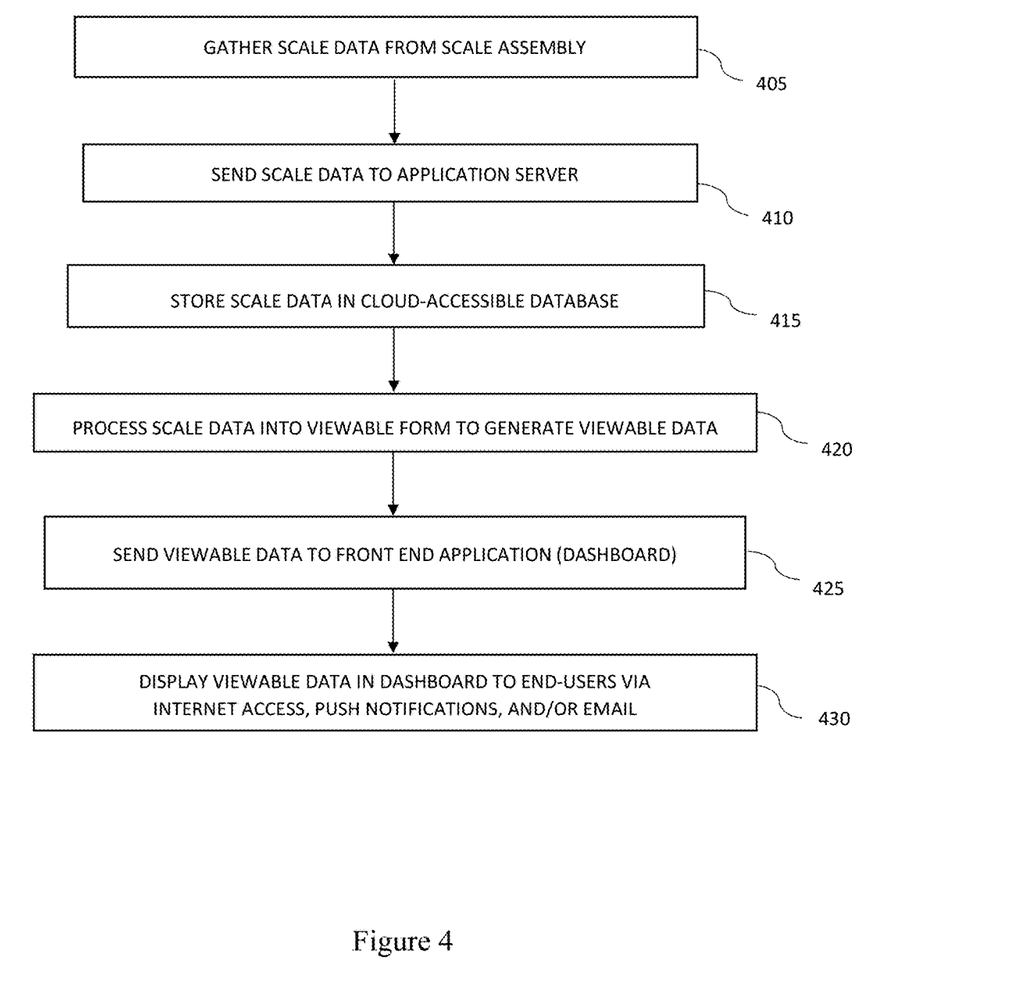
FIG. 4 is a flow chart illustrating an exemplary method of monitoring the dispensation of a plurality of beverage bottles.

Referring now to FIG. 4, in operation, the processor module 110 may gather scale data from the scale assembly 105 and/or receive beverage bottle 115 identification data from a bartender or other restaurant staff (405). The processor module 110 may send the data to the application server 135 (310). In some embodiments, the application server 135 may save and store the received scale data (315). The application server 135 may then process the scale data (420). A front-end application 140 may be used to query, or otherwise access the processed data on the application server 135 to receive the processed data in a viewable form (425). The application server 135 may also push data to end users through the front-end application 140 via reports, push notifications, e-mail, and the like (430).

Figure 5:
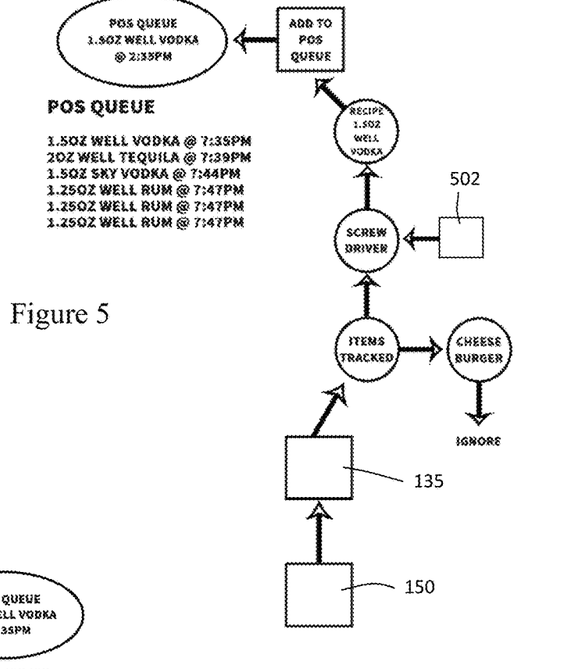
FIG. 5 representatively illustrates a flow chart for a point-of-sale queue in accordance with an exemplary embodiment of the present technology.

More specifically, and referring now to FIG. 5, the application server 135 is configured to receive POS data from the POS system 150. POS data is generated when an order is placed by one or more customers and/or tables within the establishment. POS data may initially include information pertaining to the entire order and include both food and beverage items. Upon receipt of the POS data from the POS system 150, the application server 135 may review each ordered item and create a POS QUEUE for beverages that are monitored as part of the beverage monitoring system 100.

To generate the POS QUEUE, the application server 135 disregards non-tracked items such as food items and non-alcoholic drinks. A recipe database 502 may be used to identify drinks tracked by the beverage monitoring system 100, break those drinks down into individual expected ingredient quantities corresponding to monitored drinks/beverage bottles 115, and populate the POS QUEUE with individual entries. POS data may also comprise an order time corresponding to the time when the order was received by the POS system 150. For example, an order from the POS system 150 may comprise an order for a Screwdriver. The recipe database 502 may be used to convert the order into ingredient parts which includes 1.5 ounces of well vodka. The POS QUEUE may then be populated with an entry for 1.5 ounces of well vodka with a time stamp set to the time the order was received in the POS system 150.

The recipe database 502 may comprise any suitable data and may comprise a predetermined set of recipes and/or recipes entered by the end user. For example, drink recipes for the specific establishment may be entered into recipe database 502, such as the expected amount of a particular brand of liquor to be used in a generic or proprietary drink recipe. Other additional data may comprise historical sales data, cost of each beverage bottle 115, and/or the price of each drink serving paid by the customer.

Figure 6:
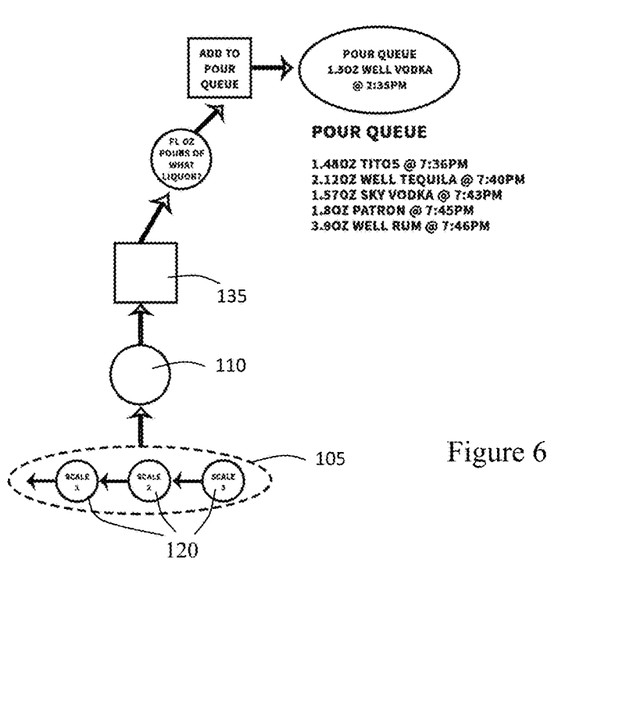
FIG. 6 representatively illustrates a flow chart for a pour queue in accordance with an exemplary embodiment of the present technology.

Referring now to FIG. 6, the POS system 150 may be configured to forward drink orders to a bar for preparation. As a bartender prepares the drinks one or more beverage bottles 115 may be used. As each beverage bottle 115 is used, the scale assembly 105 and/or the processor module 110 creates scale data based on which beverage bottle 115 was used, records any sensed weight or volume change in the beverage bottle 115, records the time the beverage bottle 115 was removed from the scale assembly, and records the time the beverage bottle 115 was replaced. This scale data is sent from the processor module 100 to the application server 135 as a POUR QUEUE. For example, the bartender may receive the order for the Screwdriver from the POS system 150 and use the beverage bottle 115 corresponding to well vodka. The scale assembly 105 records the removal of the beverage bottle 115 containing the well vodka from the corresponding scale coaster 120. When the beverage bottle 115 is returned, the scale assembly 105 records both the time the beverage bottle 115 was replaced but also the weight/volume change of the beverage bottle 115. Any difference in the weight/volume of the beverage bottle 115 is added to the POUR QUEUE along with a time stamp. Before adding a sensed weight difference to the POUR QUEUE, the processor module 110 may convert the sensed weight change into an equivalent fluid ounce decrease of the corresponding beverage bottle.

The application server 135 is configured to compare the POUR QUEUE to the POS QUEUE as each is updated or otherwise generates new data. In one embodiment, referring now to FIG. 7, the application server 135 is configured to reconcile line items from the POUR QUEUE with line items from the POS QUEUE in real-time. The reconciliation process uses both poured amounts from a beverage bottle 115 and a time stamp from the POUR QUEUE and an expected poured amount and time stamp form the POS QUEUE. For example, with continued references to the examples provided above, the application server 135 may identify the order of 1.5 ounces of well vodka from the POS QUEUE at 2:35 PM and also identify a pour of 1.5 ounces of well vodka from the POUR QUEUE at 2:35 PM. Since the two queues agree with each other, the application server 135 may reconcile these two entries as a valid pour.

Figure 7:
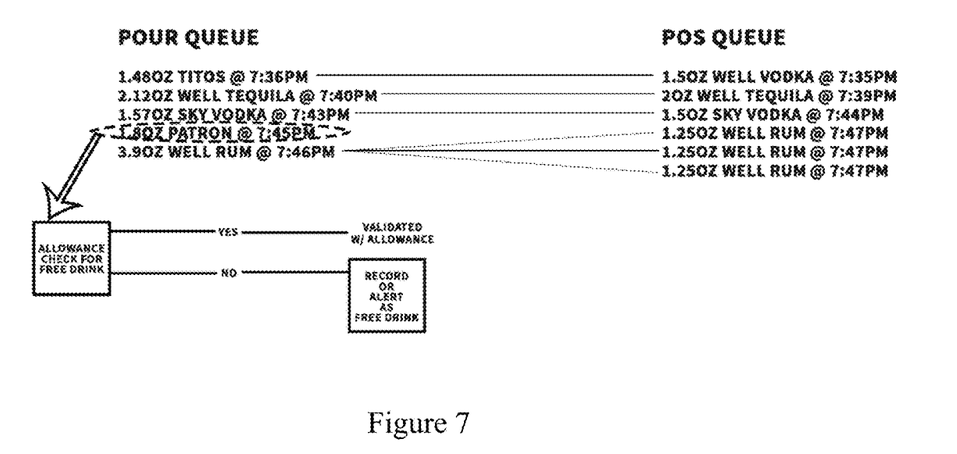
FIG. 7 representatively illustrates a flow chart for a reconciliation process in accordance with an exemplary embodiment of the present technology.

The application server 135 is also configured to identify mismatches (also referred to as irregularities) between beverage dispensation scale data and POS data from the POS system 150. Processing of the incoming data by the application server 135 may produce a variety of processed data for viewing by the end user. For example, the processed data may comprise inferences into the cause of identified irregularities. The inferences may comprise estimates or educated guesses that may be made based on the comparison of the POUR QUEUE to the POS QUEUE. For example, one type of inference may be classified as overpouring if a pour fell outside the range defined by the owner for a particular cocktail.

The application server 135 and/or processor module 110 may be suitably configured to accommodate noise elements such as vibrating beverage bottles 115, negligible changes in weight, and/or acceptable variances. For example, application server 135 and/or processor module 110 may disregard changes in weight below a threshold of less than one gram as noise. In one embodiment, the beverage monitoring system 100 may be set up with a desired accuracy variance setting set to accommodate acceptable variances due to human usage. For example, the beverage monitoring system 100 may be set with a variance setting of 15%. The application server 135 may then allow a variance of ±15% for all pours recorded by the POUR QUEUE. By way of example, if a recipe calls for 2 ounces of well tequila but 2.2 ounces is poured, the application server 135 would determine that the difference between the expected pour and the actual pour represents a 10% variance which is within the allowed tolerance. Accordingly, the application server 135 would not flag this event as an overpour infraction.

Another example of an inference based on an identified irregularity may be substitute pouring. For example, suppose a cocktail order was entered into the POS system 150 at 7:35 PM and based on the recipe it is expected that 1.5 ounces of well vodka will be used. However, the POUR QUEUE may not contain an entry for well vodka at or near 7:35 PM, but at 7:36 PM 1.48 ounces of a premium vodka was poured. Accordingly, the application server 135 may infer a substitute pour was done because the expected ingredient was not poured and a similar sized pour of something within the same category was poured with no associated entry in the POS QUEUE.

The application server 135 may also be configured to determine whether or not an identified irregularity may be dismissed or otherwise validated as an available allowance. In one embodiment, the beverage monitoring system 100 may be configured to include a list of allowances that can be used by the application server 135 to disregard or validate a transaction in the POUR QUEUE that cannot be reconciled with the POS QUEUE. For example, allowances are pre-defined behaviors or infractions staff may be allowed to do a certain number of times per shift that would traditionally be flagged as an irregularity used to generate an inference. Allowances may comprise any suitable set of criteria or rules that may be applied to a particular employee or shift such as: a particular number of "free" drinks that a given employee may give away during a single shift or a particular number of "upgrades" that may be used in place of a well beverage.

Referring again to FIG. 7, the POUR QUEUE may record a 1.8 ounce pour of a premium tequila at 7:45 PM. The application server 135 may try to reconcile that entry with the POS QUEUE without success. After generating an inference, the application server 135 will check to determine if there is an available allowance that can be used to reconcile the irregularity. The check may involve a multi-step process that begins with determining whether or not the irregular pour qualifies for an allowed free drink allowance. For example, during each shift, a bartender may be allowed to give away up to two free 1.5 ounce shots of a well drink. The application server 135 may first determine if the premium tequila poured falls within the allowable types/brands of beverages that may be given away. In this instance, if the premium tequila does not fall under an allowance, then there is no allowance available and the generated inference is passed on for additional review/action.

If the premium tequila does have an allowance, then the application server 135 may determine whether or not the amount poured also has an allowance or falls within the allowed system tolerance/variance for pours. If the beverage monitoring system 100 was set with a 15% variance level, then the 1.8 ounce pour of the premium tequila may fall outside of the allowed 1.5 ounce+/−15% variance resulting in the inference generated for the irregular pour being passed on for further review/action.

If, instead, the pour had fallen within an available allowance, then the application server 135 would have validated the irregularity as an allowance. The validated transaction would disregard the generated inference since the pour fell within a prescribed action. Nevertheless, the system may still mark the validated transaction so that it may be tracked or otherwise reviewed by one or more users of the beverage monitoring system 100 for completeness.

The application server 135 may also comprise an alert module that is configured to push notices relating to identified irregularities/generated inferences to one or more users as an alert in real-time. The alert may be transmitted to one or more users by any suitable method. For example, the alert module may transmit the alert via the internet to the user's email, a push notification such as to a cell phone, and/or an alert icon on the dashboard 304 to draw the user's attention to the alert.

Generated inferences that remain unvalidated by the application server 135 may be placed in an alert queue for review and/or action by one or more users. For example, a manager may be notified of one or more alerts via the dashboard 304 in real-time during the manager's shift. In response, the manager may add notes or other information about a particular alert or transaction, and potentially change the validation status depending on their security level. Additional allowances or exceptions may be made by the manager in real-time to approve transactions that were unable to be appropriately validated by the system (e.g. special guest, problem with how order was entered into POS system 150, etc.). By allowing each generated inference/alert to be reviewed and addressed in real-time, the beverage monitoring system 100 may avoid the need for users to review audit reports, shift reports, or sift through line item data looking for irregularities.

An alert may comprise any suitable data relating to the alert queue or a particular alert. For example, an alert report sent to the dashboard 304 may include information such as timestamp, employee name, item(s) ordered, recipe called for, amount actually used, type of inference/infraction (e.g. overpour, substitute pour, free pour, back pour, etc.), as well as review notes and any information pertaining to allowances reviewed by the application server 135.

In various embodiments, the processed data may also comprise scoring of bartending staff for accuracy of pours. For example, scoring may be based on how close in volume the actual pours in the POUR QUEUE are to the ordered items in the POS QUEUE. For example, a recipe for a Bahama Mama may specify 2 ounces of Captain Morgan® rum based on a recipe from the recipe database 502. If the actual pour from the bartender that made the drink was 2.1 ounces of Captain Morgan® rum, the application server 135 may generate a score based on the comparison of the Actual vs. the Ideal pour data and compare them, so this particular drink could be a 95% score because the 0.1 ounce variance equates to 5% of the 2 ounce pour. In some embodiments, the score may comprise any suitable other metric that represents the accuracy and/or the precision with which a particular bartender and/or shift prepares drinks.

The present systems and methods may be implemented in conjunction with a machine configured to receive the relevant inputs, perform the various processes and functions, and take appropriate action. In one embodiment, the systems and methods are implemented on a dedicated machine or device, such that all or some of the functions are hard-wired. In other embodiments, the systems and methods may be implemented at least partially in software, such as in conjunction with instructions stored on a non-programmable or one-time programmable memory system, such as a conventional read-only memory. Other embodiments may be implemented in a fully programmable system, such as in conjunction with a general purpose computer with sufficient processing power, memory resources, and network throughput capability to handle the necessary workload placed upon it.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A beverage monitoring system for allowing a user to monitor usage of a collection of beverage bottles and a point-of-sale (POS) system generating POS data, comprising:
   a scale assembly configured to support each beverage bottle and produce scale data;
   a cloud based application server communicatively linked to the scale assembly and configured to:
      receive the scale data from the scale assembly in real-time;
      populate a pour queue with the received scale data;
      receive the POS data from the POS system in real-time;
      populate a POS queue based on processed POS data;
      reconcile the pour queue against the POS queue to identify any irregularities between the pour queue and the POS queue in real-time;
      generate an inference about the cause of each irregularity in the reconciled data;
      compare the generated inference for each irregularity against a set of allowances to determine whether a given irregularity may be validated as a transaction that is not considered to be an irregularity;
      generate an alert queue comprising all unvalidated irregularities; and
      push the generated alert queue to a user in real-time as an alert message; and
   a front-end application communicatively linked to the cloud based application server and configured to receive the pushed alert message, wherein the front-end application is configured to:
      allow the user to review the alert queue in real-time; and
      provide the user with an option to change a validation status of any unvalidated irregularity.

2. The beverage monitoring system of claim 1, wherein the scale data comprises:
   a sensed weight change in any beverage container exceeding a predetermined lower threshold;
   an identification of the particular beverage container associated with the sensed weight change; and
   a time stamp corresponding to the sensed weight change.

3. The beverage monitoring system of claim 2, wherein the cloud based application server is configured to apply a variance to the sensed weight change.

4. The beverage monitoring system of claim 1, wherein the cloud based application server is configured to disregard data from the POS system not relating to tracked beverages.

5. The beverage monitoring system of claim 1, wherein the cloud based application server further comprises a recipe database used to:
   identify tracked drinks from the POS data;
   break identified drinks down into individual expected ingredient quantities corresponding to the collection beverage bottles; and
   populate the POS QUEUE with the individual ingredient quantities and a time stamp corresponding to the receipt of the POS data.

6. The beverage monitoring system of claim 1, wherein the front-end application comprises an application interface installed on a mobile computing platform.

7. A method of monitoring the dispensation of a plurality of beverage bottles, comprising:

receiving, with a cloud based application server, a set of scale data from a scale assembly corresponding to the plurality of beverage bottles positioned on the scale assembly;

creating a pour queue with received scale data;

receiving, with the cloud based application server, a set of point-of-sale (POS) data from a POS system;

processing the POS data to create a POS queue;

reconciling the pour queue against the POS queue to identify any irregularities between the pour queue and the POS queue in real-time;

generating an inference about the cause of each identified irregularity in the reconciled data;

comparing the generated inference for each irregularity against a set of allowances to determine whether a given irregularity may be validated as a transaction that is not considered to be an irregularity;

generating an alert queue comprising all unvalidated irregularities; and pushing the generated alert queue to a front-end application communicatively linked to the cloud based application server in real-time as an alert message, wherein the front-end application allows a user to:

allow the user to review the alert queue in real-time; and selectively change a status of any unvalidated irregularity in the alert queue.

8. The method of monitoring the dispensation of a plurality of beverage bottles of claim 7, wherein:

the scale data making up the pour queue comprises:

a sensed weight change in any beverage bottle exceeding a predetermined lower threshold;

an identification of the particular beverage bottle associated with the sensed weight change; and a time stamp corresponding to the sensed weight change; and creating the POS queue comprises:

identifying tracked drinks from the POS data;

breaking identified tracked drinks down into expected individual ingredient quantities corresponding to the plurality of beverage bottles; and populating the POS QUEUE with an entry comprising the expected individual ingredient quantities corresponding to the tracked drink and a time stamp corresponding to the receipt of the POS data.

9. The method of monitoring the dispensation of a plurality of beverage bottles of claim 8, wherein the sensed weight change is converted into an equivalent fluid ounce decrease of the corresponding beverage bottle.

10. The method of monitoring the dispensation of a plurality of beverage bottles of claim 9, wherein reconciling the pour queue against the POS queue comprises:

matching entries in the pour queue with entries in the POS queue, wherein a match comprises:

a matching beverage bottle from the pour queue and a matching ingredient from the POS queue;

a matching time stamp; and a matching fluid ounce decrease in the matching beverage bottle from the pour queue and the expected individual ingredient quantities from the POS queue; and identifying entries in the pour queue without a matching entry in the POS queue as an irregularity.

11. The method of monitoring the dispensation of a plurality of beverage bottles of claim 10, wherein the cloud based application server applies a predetermined variance to the sensed weight change before comparing the fluid ounce decrease in the matching beverage bottle from the pour queue to the expected individual ingredient quantities from the POS queue.

12. The method of monitoring the dispensation of a plurality of beverage bottles of claim 7, wherein the front-end application comprises an application interface installed on a mobile computing platform.

* * * * *